[]

US011379463B1

(12) United States Patent
Kharatishvili et al.

(10) Patent No.: US 11,379,463 B1
(45) Date of Patent: Jul. 5, 2022

(54) ATOMIC ENFORCEMENT OF CROSS-PAGE DATA CONSTRAINTS IN DECOUPLED MULTI-WRITER DATABASES

(71) Applicant: Amazon Technologies, Inc., Seattle, WA (US)

(72) Inventors: Tengiz Kharatishvili, Sammamish, WA (US); Alexandre Olegovich Verbitski, Woodinville, WA (US); Justin Levandoski, Seattle, WA (US); Niket Goel, Seattle, WA (US); Kamal Kant Gupta, Snoqualmie, WA (US); Xiaofeng Bao, Fermont, CA (US); Punit Rajgaria, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 16/586,563

(22) Filed: Sep. 27, 2019

(51) Int. Cl.
  *G06F 16/00* (2019.01)
  *G06F 16/23* (2019.01)
  *G06F 9/46* (2006.01)

(52) U.S. Cl.
  CPC ......... *G06F 16/2365* (2019.01); *G06F 9/466* (2013.01); *G06F 16/2315* (2019.01); *G06F 16/2358* (2019.01)

(58) Field of Classification Search
  None
  See application file for complete search history.

(56) References Cited

U.S. PATENT DOCUMENTS

| 7,266,702 | B2 | 9/2007 | Hotti |
| 7,620,659 | B2 | 11/2009 | Novik et al. |
| 8,909,610 | B2 | 12/2014 | Reid et al. |
| 9,613,078 | B2 | 4/2017 | Vermeulen et al. |
| 9,665,609 | B2 | 5/2017 | Andrei et al. |

(Continued)

FOREIGN PATENT DOCUMENTS

WO  WO-2020119050 A1 * 6/2020 ............. G06F 9/528

OTHER PUBLICATIONS

U.S. Appl. No. 16/586,497, filed Sep. 27, 2019, Justin Levandoski.

(Continued)

*Primary Examiner* — Bai D Vu
(74) *Attorney, Agent, or Firm* — Robert C. Kowert; Kowert, Hood, Munyon, Rankin & Goetzel, P.C.

(57) ABSTRACT

Systems and methods are disclosed to implement, in a database system, a database engine node that generates write tracking transactions to atomically enforce cross-page constraints for write operations. In embodiments, the database system may include multiple database engine nodes that optimistically perform page writes without checking for potential conflicts at a shared storage system. The storage system is configured to detect and report conflicting writes on the same page. To cause the storage system to report cross-page conflicts for a write, the database engine node creates a transaction that includes the write and a write tracker (WT) operation for a tracked page. The WT operation will cause the storage system to report any conflicting writes to the tracked page before the actual write is accepted by the storage system. If a reported conflict is not favorably resolved, the database engine node will abort the entire transaction, including the actual write.

20 Claims, 12 Drawing Sheets

(56) References Cited

U.S. PATENT DOCUMENTS

| | | |
|---|---|---|
| 10,127,260 B2 | 11/2018 | Goel et al. |
| 2004/0177100 A1 | 9/2004 | Bjorner et al. |
| 2006/0004885 A1 | 1/2006 | Lubashev et al. |
| 2011/0029490 A1 | 2/2011 | Agarwal et al. |
| 2016/0147814 A1 | 5/2016 | Goel et al. |
| 2017/0357577 A1 | 12/2017 | Lee et al. |

OTHER PUBLICATIONS

U.S. Appl. No. 16/586,355, filed Sep. 27, 2019, Tengiz Kharatishvili.
U.S. Appl. No. 16/586,235, filed Sep. 27, 2019, Tengiz Kharatishvili.
"Backing Up and Archiving the Database", Database Administrator's Reference, Oracle Database Documentation Library 11g Release 2 (11.2), 2013, pp. 1-9.
Amazon, "What is Amazon Relational Database Service (Amazon RDS)?", Retrieved from https://dock.aws.amazon.com/AmazonRDS/latest/UserGuide, 2018, pp. 1-6.
David Lomet, et al., "Multi-Version Concurrency via Timestamp Range Conflict Management", 2012 IEEE 28th International Conference on Data Engineering, 2012, pp. 714-725.

* cited by examiner

*Performed by a database write node 910*

Determine that a write to be sent to a log-structured storage service modifies a first record in the first location (e.g. a first page) that is constrained by a foreign key constraint, and the foreign key constraint constraints the first record to a second record in the second location (e.g. a second page)
912

Generate, in a write tracking transaction, a first log entry for the write with a first log sequence number (LSN)
914

Generate, in the write tracking transaction, a second log entry indicating a write tracker operation with a second LSN before the first LSN, where the second log entry indicates a last LSN locally known to have modified the second page
916

Send the first and second log entries to the log-structured storage service
918

*Performed by log-structured storage service 920*

Check for conflicts with the write and the write tracker operation against the page state
922

Determine that the consistency point of the database has advanced beyond a completion point (e.g. a last LSN) of the write tracking transaction
924

Expire the write tracker operation so that it is no longer used for further conflict checks
926

ATOMIC ENFORCEMENT OF CROSS-PAGE DATA CONSTRAINTS IN DECOUPLED MULTI-WRITER DATABASES

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. Because multiple writers can write to the database, distributed concurrency techniques are needed to ensure that writes are consistently performed across the distributed system, without violating the various constraints that are guaranteed by the database system.

BRIEF DESCRIPTION OF THE DRAWINGS

FIG. 9 is a flowchart illustrating a process of atomically enforcing cross-page data constraints in an optimistic multi-writer database using generated log entries for write tracker operations, according to some embodiments.

Figure 1:
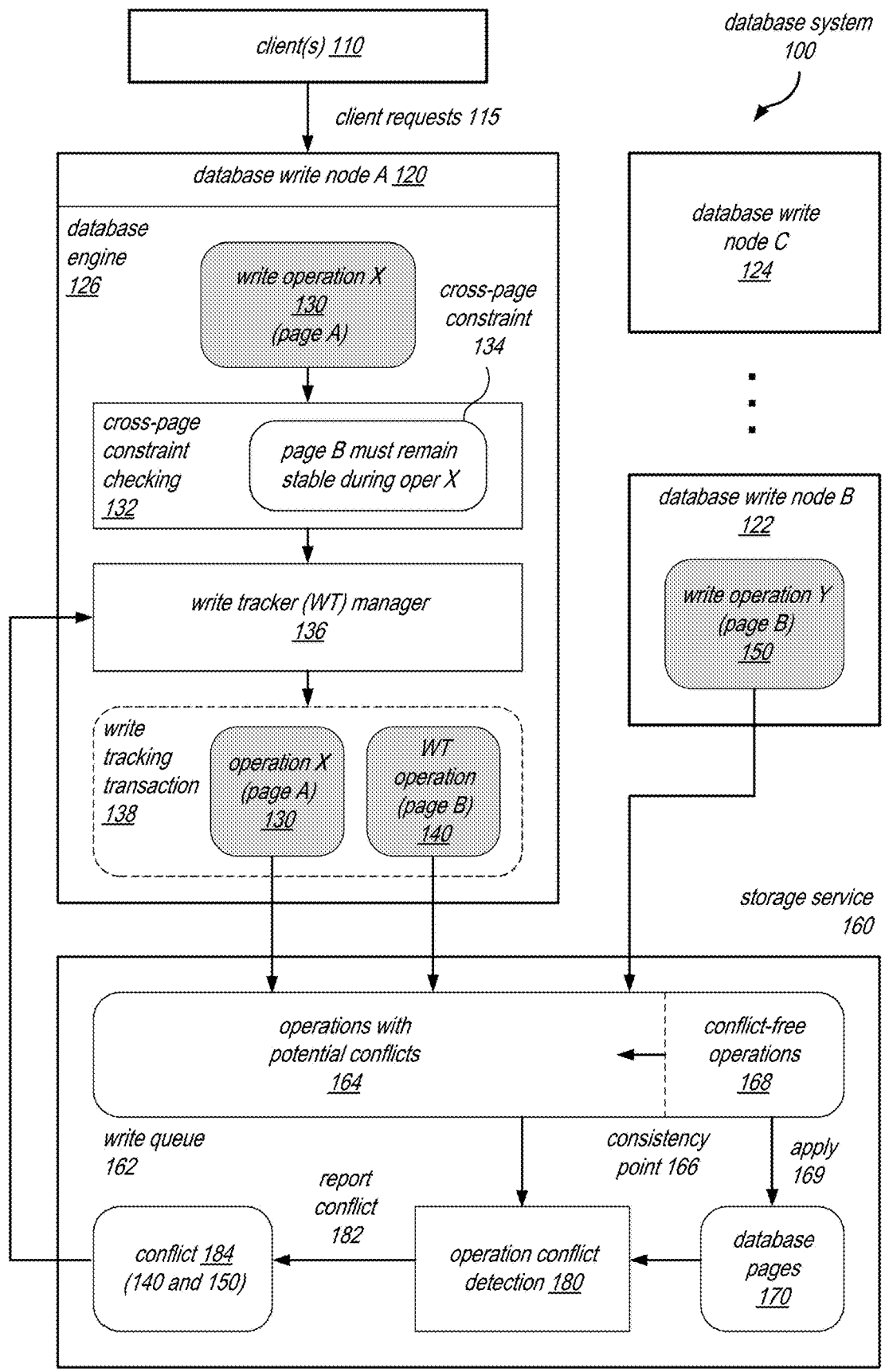
FIG. 1 is a block diagram illustrating an example optimistic multi-writer database that employs write tracker operations to atomically enforce cross-page data constraints, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement an optimistic multi-writer database system that employs write tracker operations to atomically enforce cross-page data constraints.

Database system may be implemented in a multi-master or multi-writer scheme, where multiple database engine nodes are able to generate write operations to a shared storage layer of the database. In some embodiments, such multi-writer database systems may be implemented in a decoupled architecture, where the individual database nodes operate independently to submit writes to the shared storage layer. In embodiments of such database systems, two writes from two different database nodes that update the same version of database page may be deemed to be conflicting writes at the storage layer, where only one of the two writes can succeed. To deal with such conflicts, the storage layer may serve as the arbiter of conflicts and report the conflicts and/or conflict resolutions to the database nodes. For example, the storage layer may resolve the conflicts based on which update obtains a quorum acknowledgment from a group of storage nodes. However, the database node will not know the status of its writes (accepted or rejected) until it receives a notification from the storage layer. Thus, under a "pessimistic" approach, committing the write operation requires an additional network round trip between the database node and the storage layer. Additionally, the write operation needs to wait for the time required for the storage layer to quorum resolve updates. Such an approach results in poor performance for writes in large-scale databases systems.

To improve performance, some embodiments of multi-writer database systems may generate write operations optimistically. That is, the multi-writer database will not use a global pessimistic protocol whereby writers must first reserve exclusive access to a piece of data before performing a write, or otherwise confirm that the write is conflict-free. Rather, database nodes may apply the write locally and send the write to shared storage, assuming that the write will be successful and that no other potentially conflicting writes exist in the system. Under this optimistic approach, high performance of writes may be achieved when workloads perfectly partition and do not naturally conflict.

One challenge in a multi-write database system using optimistic writes is the enforcement of cross-page or cross-location data constraints. Although storage layer is configured to detect and report write conflicts on the same page or location, it is may not be able to detect conflicts across different pages or storage locations. In one scenario, a particular update to a record on one page or at one location may require dependent data on other pages or locations to remain unchanged, if the update is to succeed. A common example of this scenario arises in the enforcement of referential integrity in databases, where a foreign key column in a child table is constrained by the primary key column in another parent table. All values in the foreign key column of the child table must reference a valid (present) primary key value in the parent table. An update to a record in the child table will violate the referential integrity if, during the update, the corresponding record in the parent table is unexpectedly altered or removed by another database node. Thus, one fundamental challenge in optimistic multi-writer database systems is the maintenance of referential integrity across tables when updates from different writers do not physically conflict at the individual page level, but can still cause potential foreign key constraint violations.

Accordingly, embodiments of an optimistic multi-writer database are described herein to atomically enforce data constraints across different pages or different storage locations. In some embodiments, the enforcement mechanism may be used to maintain the stability of related data at different locations, such as to maintain referential integrity between different database tables. In some embodiments, the database node generates a "blank update" or write tracker (WT) operation to the data that should remain stable during the lifetime of an actual write, and sends both operations to the storage layer. The write tracker operation will cause the storage layer to report a conflict if write-time state of the tracked data at the storage layer differs from the version of the same data read within the database node.

In some embodiments, the writer tracker operation is issued within a write tracking transaction generated and managed by the database node. In some embodiments, a write tracking transaction may include a collection of updates and/or write trackers, where each operation corresponds to a log sequence number (LSN). The storage layer may receive these write operations and log them in an authoritative database log for all writer nodes of the database, and report any page conflicts detected in the receive operations. If a conflict is detected, the database node will cause all the operations of the write tracking transaction to succeed or fail atomically. That is, if one LSN in the write tracking transaction is rejected by the storage layer, the entire tracking transaction may be aborted by the database node. In some embodiments, the write tracker operation does not actually change the contents of the tracked page or storage location. In some embodiments, the write tracker operation may include a previous LSN field that indicates the version of the tracked page that was read at the database node at the time of the operation. The previous LSN represents the version of the page that is must remain stable during the life of the write tracking transaction. Thus, in the context of enforcing foreign key constraints, the write tracking transaction may be used to guarantee that the parent key of the constraint does not change during an update of the dependent child record.

In some embodiments, real write operations or page updates may have different lifetimes from the write tracker operations. The real page updates, if successful, are permanently applied to the database. However, the write tracker operations will not have any lasting effects on the database state. In some embodiments, these write tracker operations may not be persisted in the logged history of the database system. In some embodiments, the storage layer may remove the write tracker operation as soon as the database node acknowledges the write operation, or when the storage layer confirms that it has accepted the write. In some embodiments, the storage layer may only consider a write tracker operation to be "valid" for performing conflict detections from the time it receives the write tracker operation to until the time that the database node acknowledges the write tracking transaction back to the storage layer.

Advantageously, embodiments of the optimistic multi-writer database described herein improve the functioning of database systems to provide a number of technical benefits to these database systems. In one respect, the write tracking transactions allow the multi-writer database system to guarantee that foreign key constraints are not violated, despite the possibility of conflicting writes to the parent and child tables from different database nodes. As may be appreciated by those skilled in the art, the write tracking transaction may be used in a wide variety of situations to enforce different types of cross-page or cross-location data dependencies. As another example, the write tracking transaction may be used during a rollback process to ensure that no changes are made to a primary index while a dependent secondary index is being updated.

In another respect, the disclosed write tracking transaction features can be used to easily implement cross-page conflict detection on top of a storage system that only implements conflict detection for a single page. The disclosed features may be easily implemented by adding a new type of operation (the write tracker operation) that is designed to work with the single-page conflict detection functionality of the storage system. Accordingly, cross-page conflict detection can be implemented without requiring substantial changes to the core functionality of the storage system.

In yet another respect, the disclosed write tracking transaction features do not add significant burdens to the operations of the storage system. As discussed, the write tracker operation does not actually cause the state of the database to change. It is only used for conflict detection purposes. Moreover, in some embodiments, the write tracker operation may be expired as soon as the it is no longer needed (e.g., when the database consistency point advances past the completion point of the write tracking transaction). Thus, the write tracker operations will typically have short lifespans in the storage system, and their use will not cause significant performance impacts on the storage system. These and other features and benefits of the write tracking transaction features are described in further detail below, in connection with the figures.

FIG. 1 is a block diagram illustrating an example optimistic multi-writer database that employs write tracker operations to atomically enforce cross-page data constraints, according to some embodiments.

As shown, the depicted database system 100 is implemented using a number of database write nodes, including node A 120, node B 122, and node C 124. In some embodiments, each of these database nodes 120, 122, and 124 may implement a database engine 126 of the database system. For example, in some embodiments, the database engine 126 may implement components to write and query data in the database. In some embodiments, the database may be a Structured Query Language (SQL) database that organizes its data in tables. In some embodiments, the database may be a non-SQL database. As shown, each database write node may be used to independently service client requests 115 from clients 110. In some embodiments, the database write nodes may interact directly with the clients 110. In some embodiments, the database write nodes may be implemented behind a client-facing endpoint, request router, or load balancer, so that they interact with the clients 110 through the particular frontend component.

As shown, in the depicted example, the database 100 also includes a storage service 160, which is shared among the database write nodes A, B, and C. In some embodiments, the storage service 160 may be a log-structured storage service that maintains a database log which logs the write operations sent by the database write nodes. As shown, in some embodiments, the received write operations may be queued in sequence, in a write queue 162. In some embodiments, after a contiguous sequence of write operations are verified to be conflict free, the write operations may be logged into the database log and may be considered durable in the database. The storage service 160 may then apply 169 the logged write operations in sequence order, to the database pages 170 of the database. The database pages 170 may store the data of the database in a more organized order (e.g., in tables and in individual records), so that they can be easily fetched in response to queries handled by the database nodes. In some embodiments, the backend storage of the database 100 may not be log-based. In some embodiments, the backend storage of the database 100 may not be implemented as a storage service. For example, in some embodiments, the backend storage may simply be a shared storage volume that provides a storage call interface to the database nodes. However, in some embodiments, the backend storage may be implemented as an independently running service, which may include a large fleet of auto-scaled nodes with associated storage devices. In some embodiments, the storage nodes and storage devices of the storage service 160 may be divided over multiple geographical area of availability zones, so that data in the database can be partitioned or replicated across the different areas or zones to improve database performance and/or availability.

In some embodiments, the database write nodes A, B, and C, may be implemented in a decoupled or loosely coupled scheme, so that before the nodes apply writes (e.g. page writes) locally (e.g. to a page cache at the node) and send write requests to the storage service 160, they do not first coordinate among one another to check for write conflicts. That is, the database write nodes may apply the writes and send the writes to the storage service 160 optimistically, assuming that the writes do not cause any page conflicts. In some embodiments, a page write operation on a page will assume a previous state of the page, which may be cached at individual ones of the writer nodes. In some embodiments, the cached states on each of the writer nodes may be slightly different. In some embodiments, the correctness of the database 100 requires all page writes in the database to be serializable to a global sequence of write operations. Accordingly, in some embodiments, two page writes may constitute a conflict if they concurrently update the same version of the same page. In the case of such page conflicts, only one of the two write operations will be allowed to proceed at the storage service 160, and the other one will be rejected to be retried later.

In some embodiments, the storage service 160 may be configured to detect these page conflicts. For example, as shown, the storage service 160 may implement write queue 162 that includes a set of operations with potential conflicts 164, and a set of conflict-free operations 168. The storage service 160 may gradually check operations in the set 164 and move those operations without page conflicts to the set 168. In some embodiments, the sets 164 and 168 may be two different queues. In some embodiments, the set 168 may be implemented as the database log. In some embodiments, the checking of conflicts may be performed by an operation conflict detection component 180, as shown. In some embodiments, the conflict detection component may check each operation to ensure that its expected state of the page being updated matches the latest state of the page as known to the storage service. If not, this means that an intervening operation has modified the page before the new operation, and the new operation must be rejected. In some embodiments, the rejection may be reported to the database node that issued the rejected write, which may cause that database node to refresh (e.g. fetch) the current version of the page from the storage service.

As shown, in some embodiments, the dividing line between the conflict-free operations 168 and the operations with potential conflicts 164 may be a consistency point 166 of the database. In some embodiments, page writes after this consistency point may be guaranteed by the storage service to be conflict free across all of the database writer nodes. Thus, LSNs after the consistency point 166 becomes a part of the official history of the database and eventually applied to the database pages 170. In some embodiments, page writes or LSNs in the set 168 may be guaranteed to be durable. It is noted that although the figure shows the write queue 162 to be a single data structure, in some embodiments, the operations may be stored in other types of data structures, for example, a series of separate queues implemented by the storage service.

Although the storage service 160 may be configured to detect and report page conflicts on the same page or storage location, as discussed, the storage service 160 is not configured to detect or report cross-page conflicts. Such conflicts may arise where, for example, the contents of one page (e.g. page A) depends on the contents of another page (e.g. page B), and two writes concurrently update the two pages to violate the dependency. In this situation, neither of the two database nodes are in a position to detect this conflict, because they are not aware of the write operation of the other node, and are configured to perform their respective writes optimistically. Additionally, the storage service 160 is also not in a good position to detect this sort of conflict, because the storage service is designed to only operate at the storage level, without any knowledge of application-specific constraints. Accordingly, in some embodiments of the database 100, the database writer nodes will inject a special type of write tracker operation, to cause the storage layer to detect and report a write that violates a cross-page constraint. The cross-page conflict will be reported to the database writer node, and the database writer node will then handle the conflict appropriately to enforce the cross-page data constraint.

As shown, in the illustrated example, database node A 120 generates a write operation X 130 on page A. In some embodiments, the write operation X may be evaluated by a cross-page constraint checking component 132. The checking component 132 may be implemented as part of the write pipeline of the database engine 126. In some embodiments, the checking component 132 may be implemented as part of the write tracker manager 136. In some embodiments, the cross-page constraints to be checked may be hardcoded into software modules that implement these portions of the database engine. In some embodiments, the constraints may be configurable via a configuration component. In some embodiments, functionality of the constraint checking component 132 and the write tracker manager 136 may be implemented as discrete library modules, so that it can be used in a variety of other client modules in the database engine 126 to enforce different types of cross-page constraints. As shown, in this example, the cross-page constraint checker 132 detected a cross-page constraint 134 for the write operation X 130. As shown, the constraint 134 requires that page B must remain stage (or unchanged) during the write of page A.

In some embodiments, once a cross-page constraint 134 has been detected for a write operation, a write tracker (WT) manager component 136 may be invoked. In this example, the WT manager may be tasked with generate a write tracking transaction 138. In some embodiments, the write tracking transaction 138 may include the original operation X on page A, as well as a writer tracker operation 140 on page B. In some embodiments, these writes may be generated as log entries to be added to the database log maintained by the storage service 160. In some embodiments, the WT operation on page B may specify the page identifier of page B. However, the WT operation may cause no change or effect on the state of page B. In some embodiments, this no-op operation may be implemented as a special type of operation recognized by the storage service 160. In some embodiments, the WT operation 140 may simply be a normal write operation that is generated to cause no actual change to the target page.

In some embodiments, the WT operation 140 may include additional metadata fields that may be used by the storage service 160. For example, in some embodiments, the WT operation 140 may include a reference to its accompanying operation (operation X). In some embodiments, the WT operation 140 may explicitly indicate a completion point of the write tracking transaction 138 (e.g., the LSN of the last operation in the WT transaction). In some embodiments, the two operations 130 and 140 may simply be sent as two routine write operations to the storage service 160, without any additional metadata. In some embodiments, no special or additional functionality is implemented by the storage service to handle the WT transaction, and it is up to the database write node 120 to maintain and manage the write tracking transaction 138.

As shown, in this example, the two operations 130 and 140 are initially added to the set of operations with potential conflicts 164, which are used to check for page conflicts with existing pages 170 in the database, as well as earlier in-sequence write operations in the write queue 162. As shown, in this example, another database writer node B 122 has previously generated a write operation Y 150 on page B. Because operation Y 150 and the WT operation 140 are not aware of one another, they are not serializable to produce two successive states of the same page (page B). Accordingly, at some point, the operation conflict detection component 180 detects and reports 182 a conflict 184. As shown, the conflict 184 indicates that a page conflict exists between the WT operation 140 and the write operation Y 150.

In some embodiments, the page conflict 184 may be reported back to both of the database engine nodes that are involved in the conflict (here database write nodes A 120 and B 122). In some embodiments, the reported conflict 184 may be the result of conflict detection performed at the storage layer, which may also resolve the conflict, for example, by using a quorum-based conflict resolution protocol. In some embodiments, the storage layer may indicate to the database engine nodes whether its writes are accepted or rejected, so that the database engine nodes can update its cache state accordingly, and possibly take additional actions to rollback and/or retry rejected writes.

If it is determined that the WT operation 140 on page B is to be cancelled in favor of operation Y 150, the WT manager 136 will ensure that all operations in the write tracking transaction 138 is also cancelled. Thus, the WT manager 136 ensure that the write tracking transaction 138 is a performed as an atomic operation, in an all-or-nothing fashion. In this manner, operation X on page A can only succeed if the WT operation on page B also succeeds. That is, the write of page A can only occur if no unexpected writes occur on page B prior to the write of page A. Accordingly, the cross-page data dependency between page A and page B cannot be violated by another optimistic writer node.

Figure 2:
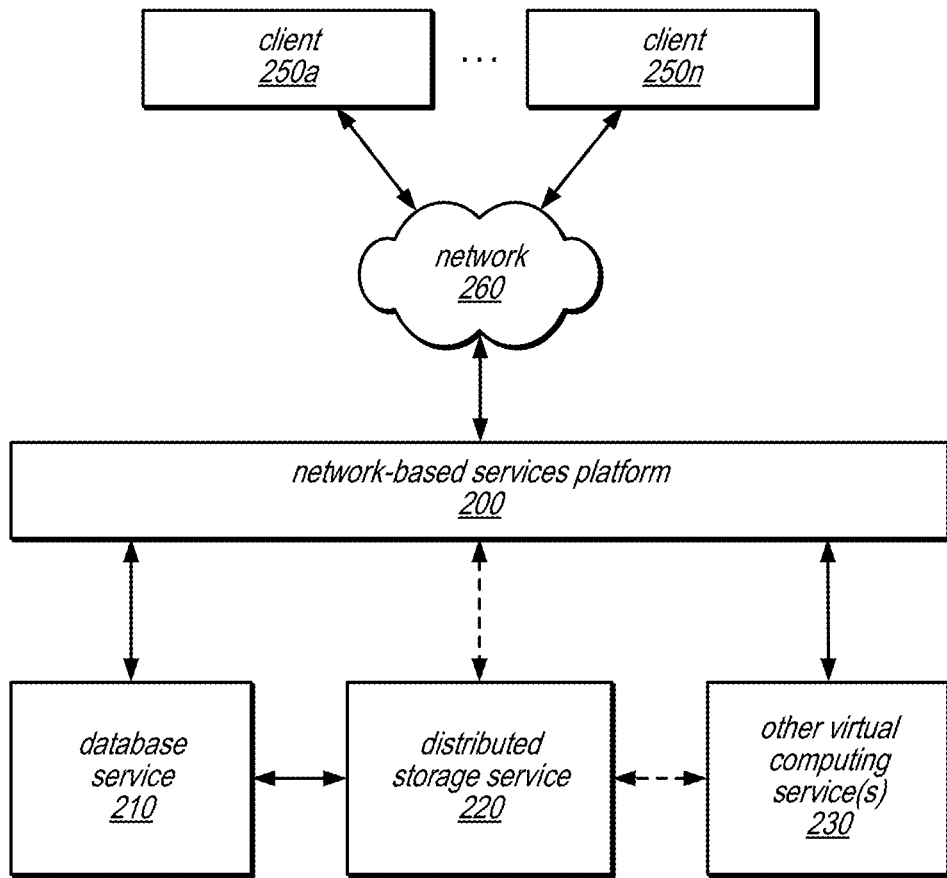
FIG. 2 is a block diagram illustrating a service system architecture that implement a database service that provides optimistic concurrency for a multi-writer database hosted in the service, according to some embodiments.

FIG. 2 is a block diagram illustrating a service system architecture that implement a database service that provides optimistic concurrency for a multi-writer database hosted in the service, according to some embodiments. In some embodiments, the clients 250 may be the clients 110 of FIG. 1, the database service 210 may implement the database system 100 of FIG. 1, and the distributed storage service 220 may be the storage service 160 of FIG. 1.

In the illustrated embodiment, a number of clients (shown as clients 250*a*-250*n*) interact with a web services platform 200 via a network 260. Web services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that interacts directly with web services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of any particular storage system service model. In some embodiments, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, query, write, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, web services platform 200 may implement one or more service endpoints to receive and process web services requests, such as requests to access data pages (or records thereof). For example, web services platform 200 may include hardware and/or software to implement a particular endpoint, such that an HTTP-based web services request directed to that endpoint is properly received and processed. In one embodiment, web services platform 200 may be implemented as a server system to receive web services requests from clients 250 and to forward them to components of a system that implements database service 210, distributed storage service 220 and/or another virtual computing service 230 for processing. In other embodiments, web services platform 200 may be implemented as a number of distinct systems (e.g., in a cluster topology) implementing load balancing and other request management features to dynamically manage large-scale web services request processing loads. In various embodiments, web services platform 200 may support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, the platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent one interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through web services platform 200 to provide storage of databases or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may receive storage services from distributed storage service 220 (e.g., through an API directly between the virtual computing service 230 and storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Figure 3:
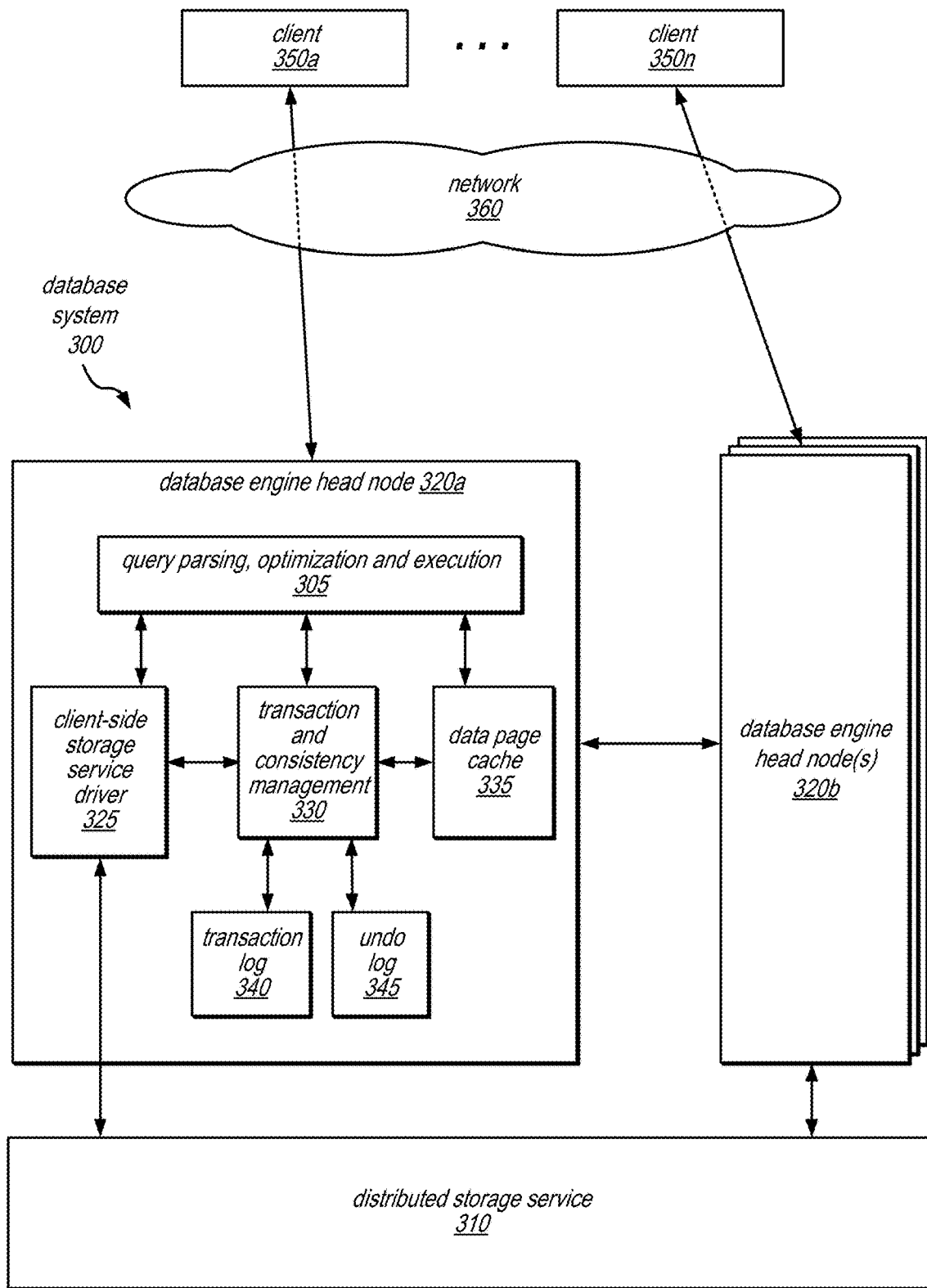
FIG. 3 is a block diagram illustrating various components of an optimistic multi-writer database system that includes multiple database writer nodes and a separate distributed storage service, according to some embodiments.

FIG. 3 is a block diagram illustrating various components of an optimistic multi-writer database system that includes multiple database writer nodes and a separate distributed storage service, according to some embodiments. In some embodiments, the database system 300 may be the database system 100 of FIG. 1, the database engine head nodes 320a and 320b may be implemented using the database write nodes 120, 122, and 124 of FIG. 1, and the distributed storage service 310 may be the storage service 160 of FIG. 1.

As shown, database system 300 includes one or multiple respective database engine head nodes 320 for each of several databases and a storage service 310 (which may or may not be visible to the clients of the database system, shown as clients 350a-350n). For example, database engine head node 320a may serve as an access point for providing read and write access to a database. As illustrated in this example, one or more of clients 350a-350n may access a database head node 320 via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, distributed storage service 310 may perform various storage, access, change logging, recovery, log record manipulation, and/or space management operations in a manner that is invisible to clients 350a-350n.

As previously noted, each database instance may include multiple database engine head nodes 320 that receives requests (e.g., requests that cause writes such as update or insert requests, etc.) from various client programs (e.g., applications) and/or subscribers (users), then parses them, optimizes them, and develops a plan to carry out the associated database operation(s). In this example, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As shown, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance, such as applying undo log records to generate prior versions of tuples of a database in order to roll back changes not visible for performing a query. As shown, database engine head node 320a may also include a transaction log 340 and an undo log 345, which may be employed by transaction and consistency management component 330 to track the status of various transactions and roll back any results of transactions that do not commit.

Note that each of the other database engine head nodes 320 illustrated in this figure (e.g., 320a and 320b) may include similar components and may perform similar functions for queries received by one or more of clients 350a-350n and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on a storage device; rather there may be an allocation map in each storage device describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
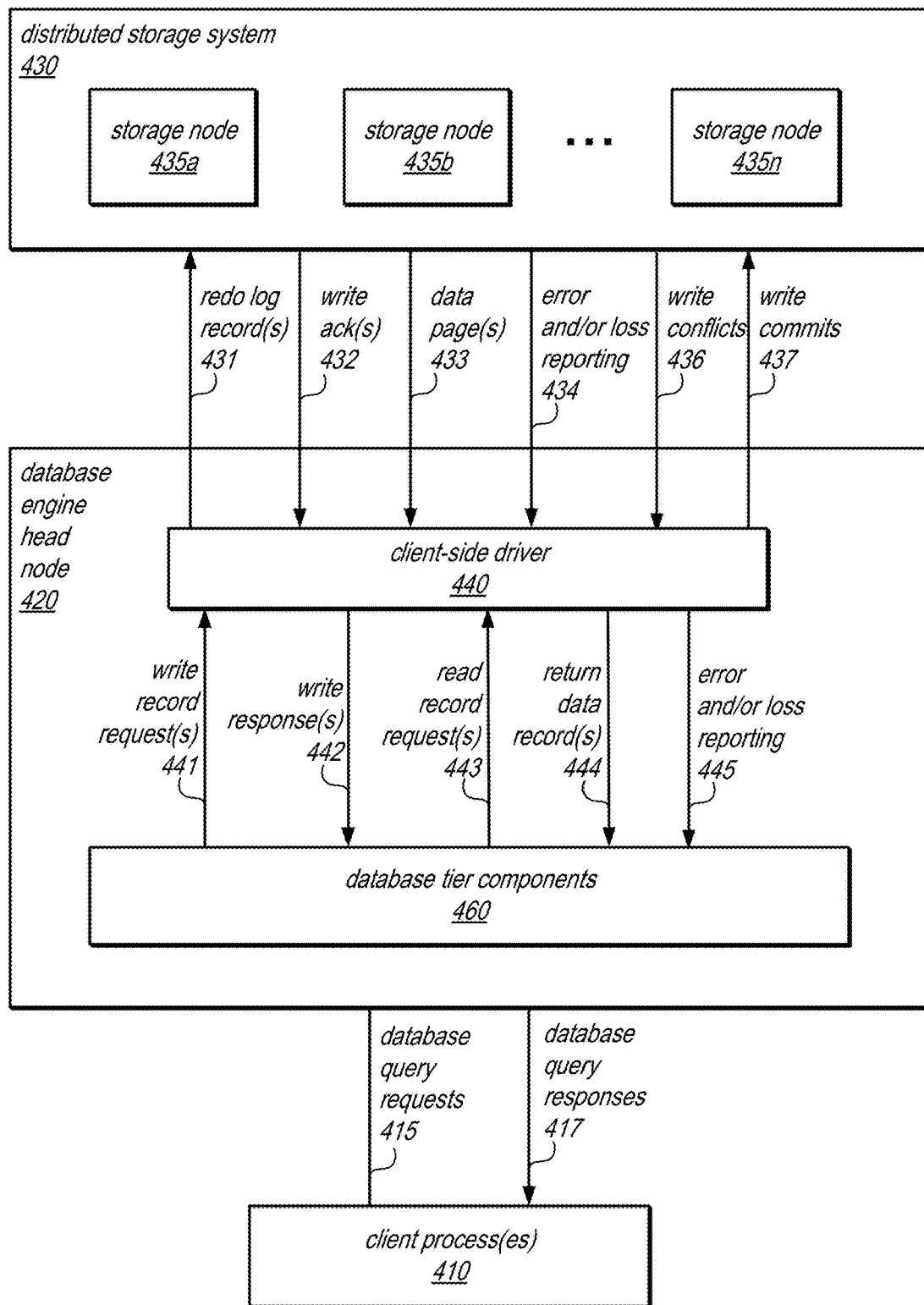
FIG. 4 is a block diagram illustrating various interactions between database writer nodes within an optimistic multi-writer database that implements optimistic concurrency, according to some embodiments.

FIG. 4 is a block diagram illustrating various interactions between database writer nodes within an optimistic multi-writer database that implements optimistic concurrency, according to some embodiments. In some embodiments, the database engine head node 420 may be the database write node 120 of FIG. 1, and the distributed storage system 430 may be the storage service 160 of FIG. 1.

As shown, one or more client processes 410 may store data to one or more databases maintained by a database system that includes a database engine head node 420 and a distributed storage system 430. As shown, database engine head node 420 includes database tier components 460 and client-side driver 440 (which serves as the interface between distributed storage system 430 and database tier components 460). In some embodiments, database tier components 460 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 410 may send database query requests 415 (which may include read and/or write requests targeting data stored on one or more of the storage nodes 435a-435n) to database tier components 460, and may receive database query responses 417 from database tier components 460 (e.g., responses that include write acknowledgements and/or requested data). Each database query request 415 that includes a request to write to a page may be parsed and optimized to generate one or more write record requests 441, which may be sent to client-side driver 440 for subsequent routing to distributed storage system 430. In this example, client-side driver 440 may generate one or more redo log records 431 corresponding to each write record request 441, and may send them to specific ones of the storage nodes 435 of distributed storage system 430. Distributed storage system 430 may return a corresponding write acknowledgement 423 for each redo log record 431 to database engine head node 420 (specifically to client-side driver 440). In some embodiments, storage nodes 435 may return write conflicts 436 (although in other embodiments write conflicts 436 may be included or not as part of write acknowledgements 432). For example, write conflicts may indicate writes that were successfully received and logged, but not committed as they conflict with other writes. Write commits 437 may be sent to indicate which conflicting writes can be committed, in some embodiments. In some embodiments, not illustrated, requests to cancel or otherwise exclude writes may be sent or requests to store one or more different log records that reconcile writes instead of previously stored log records (that individual reflect the reconciled writes) may be sent. Client-side driver 440 may pass these write acknowledgements to database tier components 460 (as write responses 442), which may then send corresponding responses (e.g., write acknowledgements) to one or more client processes 410 as one of database query responses 417.

In this example, each database query request 415 that includes a request to read a data page may be parsed and optimized to generate one or more read record requests 443, which may be sent to client-side driver 440 for subsequent routing to distributed storage system 430. In this example, client-side driver 440 may send these requests to specific ones of the storage nodes 435 of distributed storage system 430, and distributed storage system 430 may return the requested data pages 433 to database engine head node 420 (specifically to client-side driver 440). Client-side driver 440 may send the returned data pages to the database tier components 460 as return data records 444, and database tier components 460 may then send the data pages to one or more client processes 410 as database query responses 417.

In some embodiments, various error and/or data loss messages 434 may be sent from distributed storage system 430 to database engine head node 420 (specifically to client-side driver 440). These messages may be passed from client-side driver 440 to database tier components 460 as error and/or loss reporting messages 445, and then to one or more client processes 410 along with (or instead of) a database query response 417.

In some embodiments, the APIs 431-437 of distributed storage system 430 and the APIs 441-445 of client-side driver 440 may expose the functionality of the distributed storage system 430 to database engine head node 420 as if database engine head node 420 were a client of distributed storage system 430. For example, database engine head node 420 (through client-side driver 440) may write redo log records or request data pages through these APIs to perform (or facilitate the performance of) various operations of the database system implemented by the combination of database engine head node 420 and distributed storage system 430 (e.g., storage, access, change logging, recovery, and/or space management operations). As illustrated in the figure, distributed storage system 430 may store data blocks on storage nodes 435a-435n, each of which may have multiple attached storage devices. In some embodiments, distributed storage system 430 may provide high durability for stored data block through the application of various types of redundancy schemes.

Note that in various embodiments, the API calls and responses between database engine head node 420 and distributed storage system 430 (e.g., APIs 431-434) and/or the API calls and responses between client-side driver 440 and database tier components 460 (e.g., APIs 441-445) may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 420 and/or distributed storage system 430.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality.

In various embodiments, multiple writers implemented at different respective database engine head nodes may be allowed to access a same database while maintaining a single, global read view of the database. Optimistic concurrency may be implemented for writes performed by the different writers using shared storage and asynchronous I/O, in various embodiments. In some embodiments, database engine head nodes (or other write nodes) may be seamlessly added or removed for a database without disruption of database clients.

In some embodiments, database write nodes may use an asynchronous write model to achieve higher write performance with reasonable cost to read performance. Moreover, applying optimistic concurrency techniques may allow the write node, for instance, when writing a log record to continue performing other requests without waiting for the write of the log record to the log to be finalized or to be resolved on a conflict, in some embodiments.

In at least some embodiments, the isolation level supported by multiple writers may include a read-uncommitted isolation level. In some embodiments, the isolation level supported by multiple writers may include a repeatable read isolation level and/or a read-committed isolation level. In such scenarios, isolation may perform the same as if the database only had a single writer when the transactions affecting the rows are on the same instance, in some embodiments. Transactions issued to different instances may have snapshot isolation applied so that the first committed rule is applied and transactions that run into conflicts are aborted, in some embodiments. Different outcomes for such isolation levels may result depending on transaction origin (e.g., a transaction issued on the same write node may succeed where the same transaction issued on another write node would fail), in some embodiments. In some embodiments, a serializable isolation level may not be supported with multiple writers.

Figure 5:
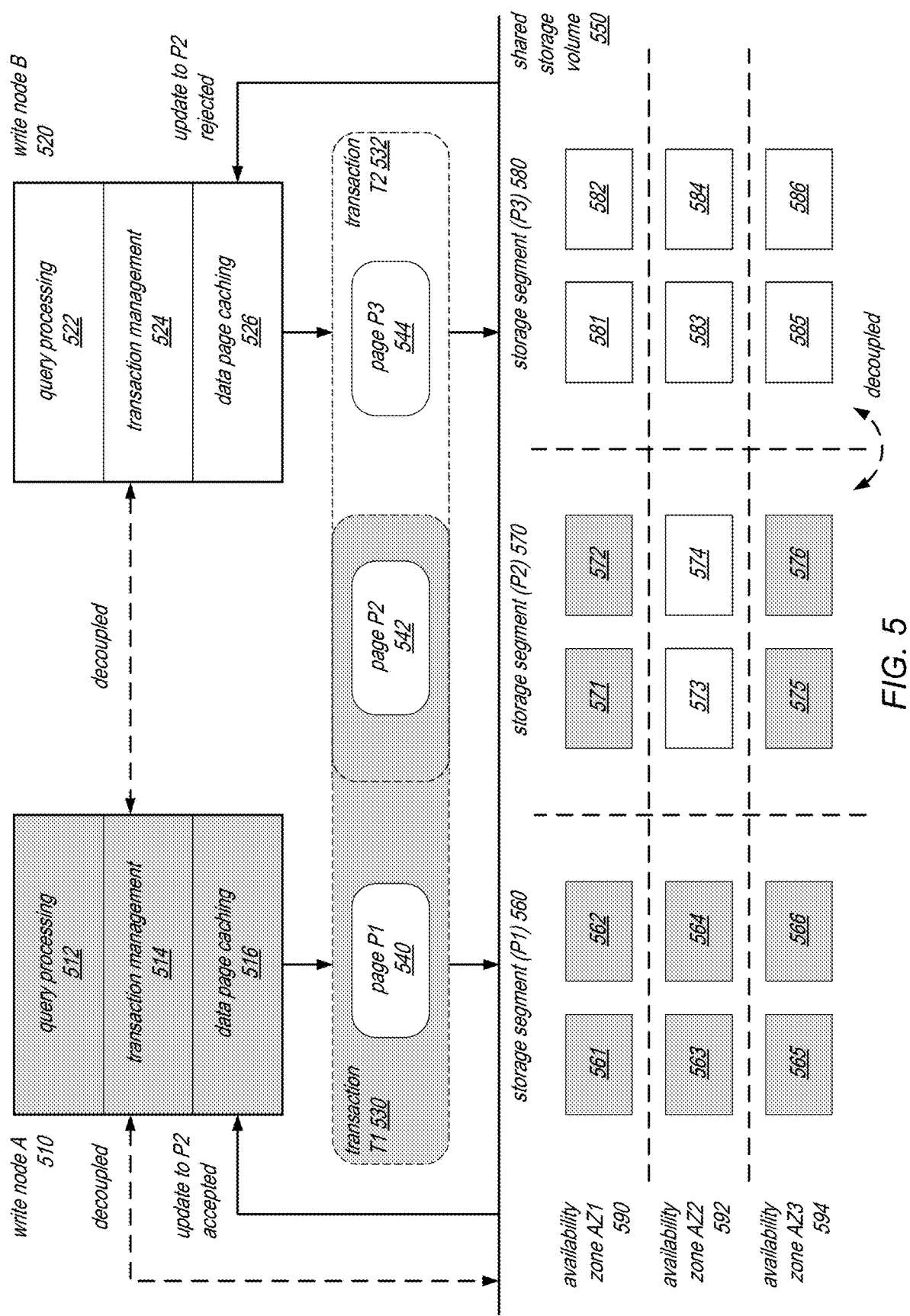
FIG. 5 is a block diagram illustrate a shared storage volume that accepts and rejects page writes based on page conflicts in a multi-writer database that implements optimistic concurrency, according to some embodiments.

FIG. 5 is a block diagram illustrate a shared storage volume that accepts and rejects page writes based on page conflicts in a multi-writer database that implements optimistic concurrency, according to some embodiments. In this example, the write nodes A 510 and B 520 may be the write nodes 120, 122, or 124, as discussed in connection with FIG. 1, and the shared storage volume 550 may be implemented by the storage service 160 of FIG. 1.

As shown, each database write node 510 and 520 in this example includes a number of functional layers or components, which are used to implement a database engine. In some embodiments, the query processing components 512 and 522 may be the query parsing, optimization and execution component 305 of FIG. 3, the transaction management components 514 and 524 may be the transaction and consistency management component 330 of FIG. 3, and data page caching component 516 may be implemented using the data page cache 335 of FIG. 3.

In some embodiments, as shown, the database system may be implemented in a decoupled architecture, where different components (e.g. the database nodes and portions of the shared storage volume 550) are implemented as independent components that can function largely independently with minimal cross-component knowledge or coordination. In some embodiments, separate components are implements on separate execution platforms (e.g. hardware servers or virtual machine instances). In some embodiments, each component may manage only a divisible portion of the functionality or data of the database system. The failure of any one independent component will not cause a global failure of the database system, and each independent component may implement their own scheme for auto-scaling and redundancy.

As shown, in this example, the write nodes A and B are decoupled. Thus, the write nodes may execute independently on different execution systems, and the two nodes may not rely on one another for core database engine functionality (e.g. to incoming SQL requests). As discussed, in some embodiments, the two write nodes may both write the shared storage volume 550 in an optimistic fashion, without coordinating with each other to resolve conflicts ahead of time. In some embodiments, the data page cache of the two nodes may reflect different states of the database.

As shown, the database write nodes 510 and 520 are also decoupled from the storage layer (e.g. the shared storage volume 550). In this respect, the storage layer and the database write nodes divide the functionality of database system. In some embodiments, the storage layer will handle all durability aspects of the database system, while the database write nodes will handle other aspects of the database system on top of the storage layer. In some embodiments, the database write nodes 510 and 520 may interact with the shared storage volume 550 via defined service interface. For example, the write nodes may submit page write operations to the storage layer, which will in turn queue and apply the page write operations to the state of the database. This type of separation represents a departure from traditional database systems, where the upper functional layers of the database system tightly coupled to the storage layer, in an integrated functional stack, which is sometimes implemented on the single server.

In some embodiments, the shared storage volume 550 or the storage layer may also implement a conflict resolution functionality, in addition to its durability functions. As discussed, in multi-writer database systems with optimistic database write nodes, the page writes submitted by the write nodes may occasional represent conflicts. For example, two writes from two different nodes may concurrently attempt to modify the same page, which may represent a conflict condition. Thus, in some embodiments, the storage layer may implement a conflict resolution protocol to both detect and resolve conflicting writes.

As shown, in this example, the storage layer is actually implemented by a number of storage nodes (nodes 561-566, 571-576, 581-586), which may be separate instances of virtual machines or virtualized instance of storage devices. As shown in this example, the storage nodes are divided into three storage segments 560, 570, and 580, and also three different availability zones 590, 592, and 594. In some embodiments, each storage segment may be assigned a range of pages for a database. In some embodiments, each availability zone may represent a zone or environment of computing infrastructure that execute independently from other availability zones (e.g. having separate power sources). By distributing storage nodes across multiple availability zones, the database system ensure that it can remain highly available in the face of the failure of one or multiple availability zones. As shown, in some embodiments, the storage segments of the shared volume are decoupled from each other. For example, even the complete failure of all storage nodes in one storage segment will not directly cause a failure of another storage segment.

As shown, in this example, each storage segment in the volume 550 is replicated across six storage nodes. In this type of system, a quorum-based conflict resolution protocol may be implemented. As shown, nodes A and B in this example have issued two transactions T1 530 and T2 532. The two transactions are issued on top of the cached state of the database seen by the two database nodes, and the two transactions are issued concurrently, so that neither transaction is aware of the other transaction. As shown, transaction T1 includes a page update to page A 540 and page B 542, while transaction T2 includes a page update to page C 544 and also page B 542. In this case, the two transactions include a pair of conflict page writes to page B 542.

When these page writes are sent to the storage layer or shared storage volume 550, the different storage nodes of the storage layer may receive the write operations at different times, and may arrive at different conclusions about how to resolve the conflict. As shown, at storage segment 560, which stores page P1, all storage nodes have accepted the update to page P1 (as indicated by the shading of nodes 561-566). At segment 580, which stores page P3, all storage nodes have accepted the update to page P3 (as indicated by the white shading of nodes 581-586). However, at segment 570, which stores page P2, some of the storage nodes (571, 572, 575, and 576) have resolve the write conflict on page P2 in favor of the write issued by write node A (as part of transaction T1), and other storage nodes (573 and 574) have instead resolved the conflict in favor of the write issued by write node B (as part of transaction T2). These nodes are shaded according to how the have resolved the conflict. In this example, the storage layer may implement a quorum-based conflict resolution protocol, where the storage layer will accept the write (and reject the other conflicting write)

when a sufficient number (a "quorum") of storage nodes have accepted the winning write. In this example, the quorum needed to accept a write may be four of the six storage nodes for a particular storage segment (i.e. a majority). Because the write issued by write node A has been accepted by four storage nodes in segment 570, this write is deemed to be the winning write. Accordingly, storage nodes 573 and 574 will be overruled and will persist the winning write from node A.

As shown, in some embodiments, when a conflict is resolved, the storage layer will report back to the database write nodes (nodes A and B) whether their submitted writes have been accepted by the storage layer. In this example, the storage layer notifies to node A that its write of page P2 is accepted, and notifies node B that its write of page P2 is rejected. It is then up to write node B to rollback the transaction T2 532, or any other operations, as a result of the rejection of its write to page P2. In some embodiments, the rollback process may involve multiple write operations, as the conflict resolution process at the storage layer may take some time.

In some embodiments, the write nodes (e.g. node A) may not commit a write in its cache state until it receives a confirmation from the storage layer that that write has been accepted at the storage layer. In some embodiments, the storage layer may report a consistency point (e.g. consistency point 166 of FIG. 1), to the database nodes, which may represent the highest LSN of writes sent to the storage layer that have been accepted. Thus, if a write node A determines that the current database consistency point has moved beyond its pending writes (e.g. writes to pages P1 and P2), it may commit the result of those writes locally.

Figure 6A:
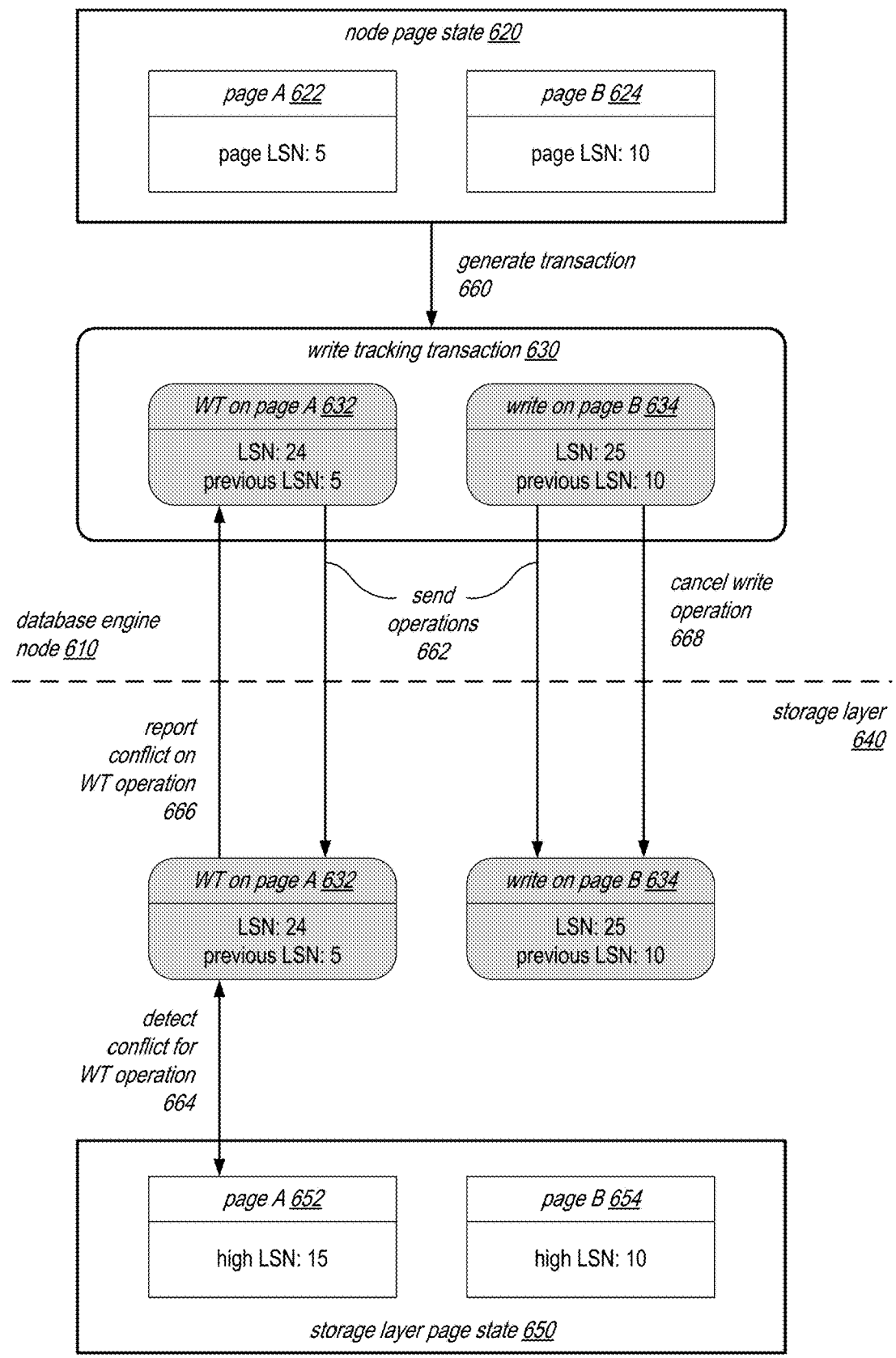
FIG. 6A is a logical block diagram illustrating a process of using a write tracker operation to atomically enforce cross-page data constraints in an optimistic multi-writer database, according to some embodiments.

FIG. 6A is a logical block diagram illustrating a process of using a write tracker operation to atomically enforce cross-page data constraints in an optimistic multi-writer database, according to some embodiments. In some embodiments, the write tracking transaction 630 shown may be implemented as the write tracking transaction 138 as discussed in connection with FIG. 1.

As shown, the figure is divided into the database engine node 610 and the storage layer 640 to indicate where particular actions are performed. The database engine node 610 may be the database write node 120 of FIG. 1, and the storage layer 640 may be implemented using the storage service 160 of FIG. 1.

As shown, in some embodiments, the database engine node 610 may maintain a node page state 620, which may include copies of certain pages or storage locations in the database. In some embodiments, the node page state 620 may be maintained in a page cache maintained by the engine node, which may be implemented as an in-memory cache. In some embodiments, the page cache may maintain a subset of pages of the database, to facilitate reading and writing of pages by the node. In some embodiments, the cached state of different database engine nodes may be different, and some nodes may have more advanced copies of certain pages than other nodes. As shown in this example, node 610 has page A 622 and page B 624 in its node page state 620. In some embodiments, each page state may be associated with a page LSN, as shown. The page LSN may indicate a last write operation that modified that particular page. As discussed, page writes may be logged in some embodiments, and the LSN may represent an in-sequence number of the write operation in the database log.

At operation 660, the write tracking transaction 630 is generated 660. As discussed in connection with FIG. 1, these transactions may be generated automatically by the database engine to enforce cross-page constraints in the database, for example, to ensure that a write to a first page can only succeed if a second page remains stable before the write. In this example, the transaction 630 will be enforced so that the write operation on page B will be accompanied by a write tracker operation 632 on page A, so that any changes to page A at the storage layer during the write to page B will be reported back as a page conflict to the database engine node 610.

As shown, in this example, the two write operations 632 and 634 are represented as log entries to be sent to the storage layer 640. In particular, each operation indicates an LSN, which represents intended the place of that operation in the log sequence. In some embodiments, the WT operation 632 may have an LSN that is before the write operation 634, so that the write operation will not be reported as accepted before the WT operation. In some embodiments, the LSN of the WT operation may be one LSN before the LSN of the write operation, so that the tracking of page B will cover the entire sequence of operations before the write operation 634. In some embodiments, a different LSN semantic may be implemented by the database engine node 160.

As shown, each operation may also indicate a previous LSN, which indicates the expected version of the page that the operation is being performed on. In this case, because the local page state at the node 160 shows the latest version of page A to be LSN 5, and the latest version of page B to be LSN 10, the two operations 632 and 634 indicate those respective values as the previous LSNs of the write operations. As shown, the two write operations are then sent to the storage layer 640. In some embodiments, the node 610 may not send any transaction metadata for the transaction 630 to the storage layer, so that from the perspective of the storage layer, the two operations 632 and 634 may appear to be unrelated operations. In other embodiments, however, some indications of the transaction 630 may be provided to the storage layer 640.

It is noted that although the WT operation 632 and the write operation 634 are illustrated as two distinct operations in this example, in other embodiments, there may not be an explicit "no-op" generated as the WT operation. Rather, the WT operation may be indicated as part of the write operation 634, for example, by setting values in metadata fields of the write operation 634. For example, the write operation 634 may include as metadata an array of other tracked pages (e.g. page A), and/or the expected LSNs that last modified those pages (e.g. LSN 5). In some embodiments, the WT operation 632 may not be explicitly assigned an LSN in the database log sequence.

As shown, when the two write operations are received by the storage layer 640, the storage layer may perform a conflict check for each operation. As discussed, the storage layer may assume that the database engine nodes are optimistic, and perform page conflict checks on all incoming writes from the nodes. In some embodiments, the conflict check may be performed against a storage layer page state 650, as shown. The storage layer page state 650 may represent an authoritatively consistent view of the database. For example, the storage layer page state may include only those page changes that have been actually made to the pages, or those writes that have been confirmed to be conflict-free. Thus, in some embodiments, the storage layer page state 650 may be constructed from a combination of the actual database pages 170 and the set of conflict-free write operations 168, as discussed in FIG. 1. As shown, each page state (e.g. page A 652 and page B 654) in the storage layer page state may indicate a high LSN, which represents the last write operation that was applied to that page.

As shown, in this example, there is not page conflict for the write on page B 634, because its previous LSN value matches the high LSN value of page B in the storage layer page state 650. Thus, the write of page B is operating on the latest version of page B in the storage layer. However, the WT operation on page A 632 has a previous LSN value that is older than the high LSN value for page A in the storage layer page state. This indicates that the WT operation is operating on a version of page A that is stale. Thus, a page conflict has been detected 664 for the WT operation on page A.

As shown, once the detection of the page conflict occurs, the conflict is reported 666 back to the database engine node 610. As discussed in connection with FIG. 1, a tracker operation manager or some other component of the node 610 may then attempt to resolve the conflict. If the conflict is resolved in favor of another operation on page A (e.g. the operation that is associated with LSN 15), the node 610 may abort all operations in the write tracking transaction 630. In this case, the write operation on page B 634 will be cancelled 668 by the database engine node 610, even though no specific page conflict was detected for that particular write. However, the write 634 is cancelled because it would violate a cross-page constraint between page A and page B.

Figure 6B:
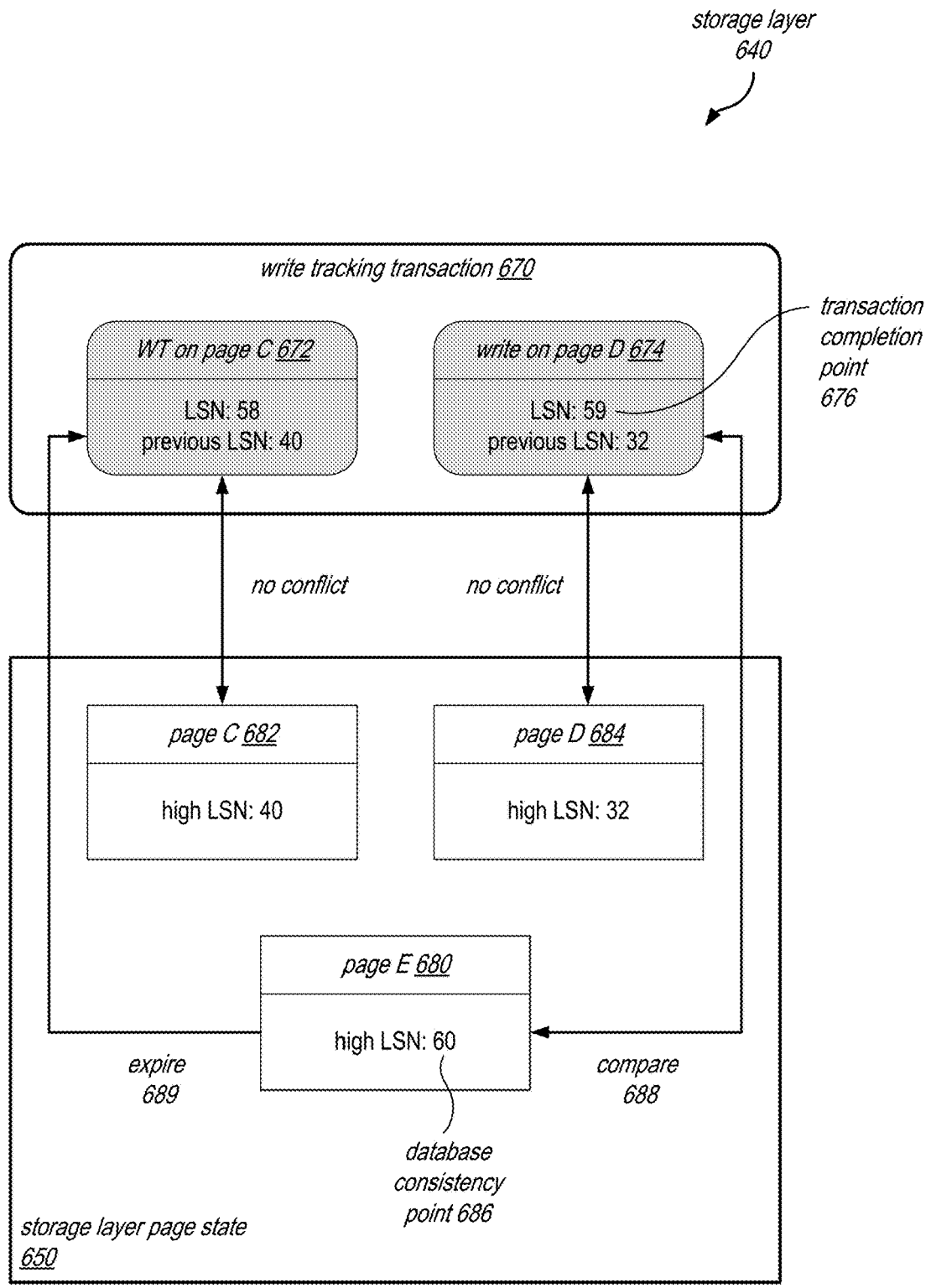
FIG. 6B is a logical block diagram illustrating a process of expiring a write tracker operation in an optimistic multi-writer database, according to some embodiments.

FIG. 6B is a logical block diagram illustrating a process of expiring a write tracker operation in an optimistic multi-writer database, according to some embodiments. As shown, in this example, the entire depicted process takes place at the storage layer 640.

In this example, another write tracking transaction 670 has been received at the storage layer 640. This transaction 670 includes a write operation 674 on a page D, and a WT operation 672 on page C. In this example, the LSN on the write operation 674 represents the completion point 676 of the transaction 670. In some embodiments, the transaction completion point may be the last LSN in all operations in the transaction, so that once that last LSN is accepted as consistent by the storage layer, the transaction may be deemed to have completed successfully.

As shown, in this example, there is not conflict detected for either operation in the transaction 670. Moreover, the storage layer page state 650 also indicates another page state for page E, which has the high LSN value of 60. In this case, the LSN that is associated with page E represent the highest LSN for all pages in the storage layer page state. That is, LSN 60 represents the database consistency point 686, which may be the same as the consistent point 166 as discussed in connection with FIG. 1. In some embodiments, the storage layer 640 may detect that the database consistency point has advanced past the transaction completion point 676, for example, by periodically comparing 688 the two values.

If it is determined that the database consistency point 686 moved past the transaction completion point 676, this may indicate that all operations in the transaction 670 has been confirmed to be conflict free. In that case, there is no more need to maintain the WT operation 672 or continue to check incoming operations against the WT operation for conflicts. In some embodiments, when this condition is met, the storage layer 640 will expire 689 the WT operation 672 for the completed transaction, so that it is no longer checked for page conflicts. In some embodiments, this may be implemented by removing the WT operation from a set of operation with potential conflicts. In some embodiments, the WT operation is simply not added to the queue of actual write operations to be applied to the database pages. As discussed, the WT operations are intended to be no-ops that do not change the pages that they are to track.

Figure 6C:
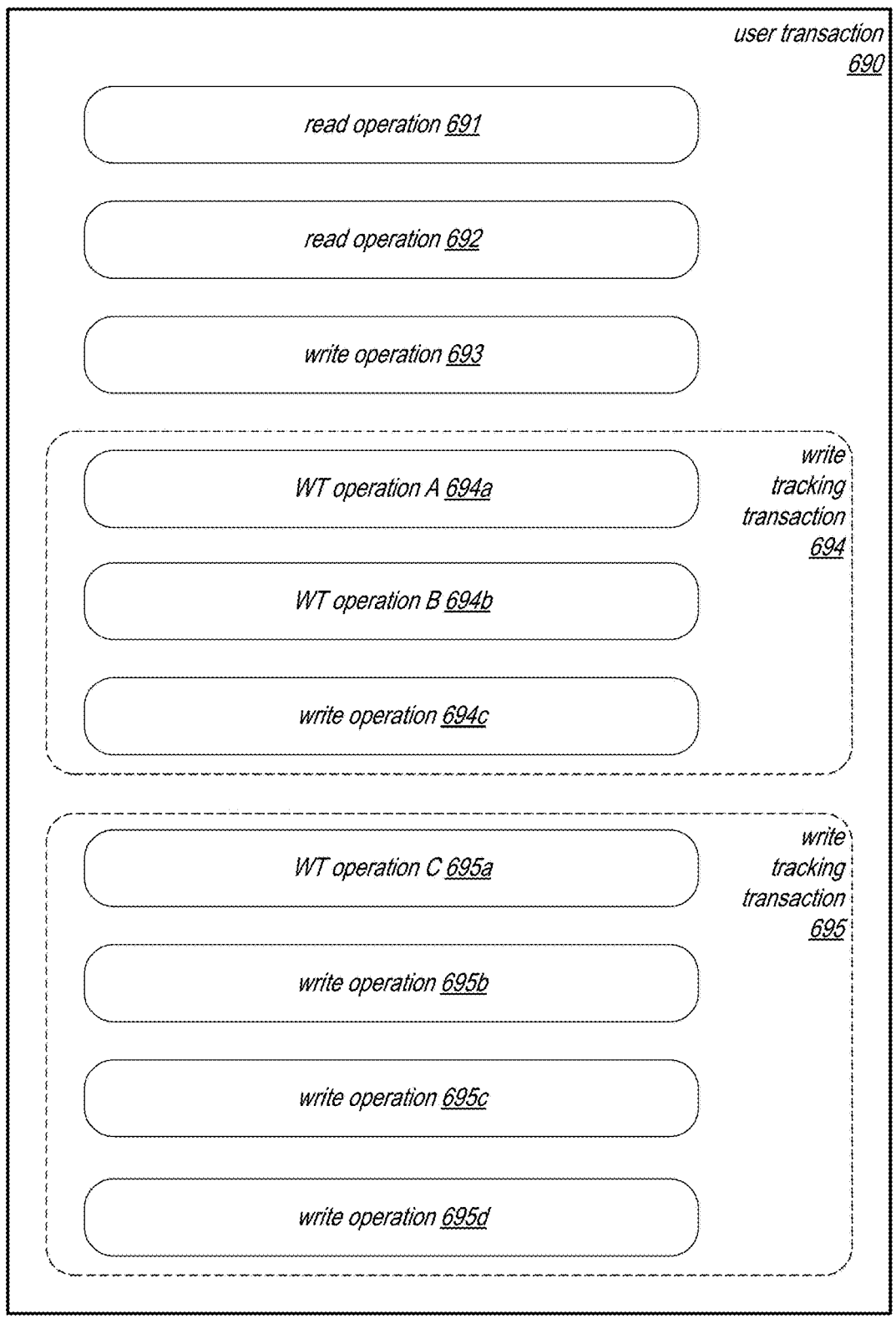
FIG. 6C illustrates an example user transaction that includes generated write tracking transactions to atomically enforce cross-page data constraints, according to some embodiments.

FIG. 6C illustrates an example user transaction that includes multiple generated write tracking transactions to atomically enforce cross-page data constraints, according to some embodiments. In this example, write tracking transaction 694 and 695 may be the write tracking transaction 138 of FIG. 1.

This figure illustrates a user transaction that is specified by a user, or a client of the database system. For example, some database systems may allow its clients to specify these transactions to group related operations together, to be performed atomically in an all-or-nothing fashion. However, these user transactions are different from the write tracking transactions (e.g. transactions 694 and 695). First, the user transaction 690 is explicitly specified by the user or client. On the other hand, the write tracking transactions are generated automatically by the database engine nodes, to prevent the violation of certain cross-page constraints in an environment of multiple optimistic database writer nodes. Second, the lifetime of the user transaction 690 ends with the specified group of operations in the user transaction, whereas the lifetime of the write tracking transaction ends with the transaction completion point of the write tracking transaction, which may not be explicitly specified, in some embodiments. However, in some embodiments, both types of transactions may be offered by the database system, and both may be managed by the database engine node.

As shown in this example, the user transaction 690 includes a number or read operations (691 and 692), followed by a write operation 693. Additionally, the user transaction includes a write tracking transaction 694. This write tracking transaction may be automatically generated by the database engine node to enforce a type of cross-page constraint, for write operation 694c. As shown, in this example, two WT operations are added to the write tracking transaction. These two WT operations will cause the entire transaction 694 to report a conflict if either of the pages tracked by the two WT operations are unexpectedly modified before the write operation 694c. In general, a write tracking transaction may associate any number of WT operations for a single write operation.

The user transaction in this example also includes another write tracking transaction 695. In transaction 695, a single WT operation 695a is included, along with three different write operations 695b-d. Thus, the WT operation 695a will cause a conflict for each of the subsequent write operations 695b-d if a modification is detected on its tracked page. Moreover, if any of the write operations 696b-c is detected to have a conflict, the conflict may potentially cause the entire transaction 695 to be aborted. In general, a write tracking transaction may include any number of WT operations and any number of write operations, depending on what the transaction is being used for.

Figure 7:
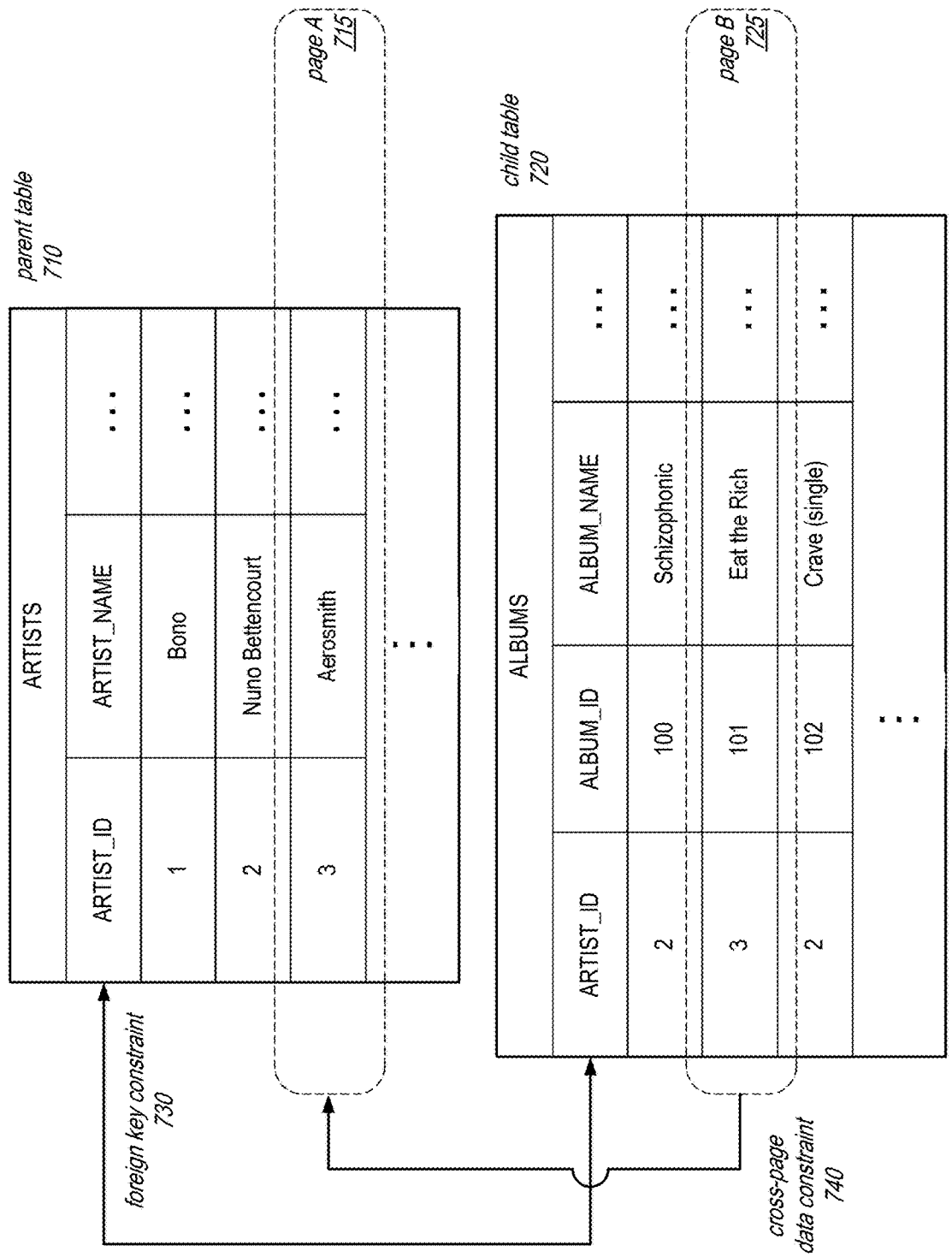
FIG. 7 illustrates a foreign key constraint implemented in an optimistic multi-writer database that may be atomically enforced using write tracker operations, according to some embodiments.

FIG. 7 illustrates a foreign key constraint implemented in an optimistic multi-writer database that may be atomically enforced using write tracker operations, according to some embodiments.

Foreign key constraints are one type of cross-page or cross-location constraint that may be enforced using write tracking transactions and write tracker operations, as disclosed herein. As shown, a foreign key constraint 730 may involve two tables, a parent table 710 and a child table 720. In some embodiments, for example in SQL databases, a column in the parent table 710 may be used on constrain another column in the child table 720. For example, in the illustrate example, all values in the ARTIST_ID column in the child table 720 must refer to a value that appears in the ARTIST_ID column of the parent table 730. The foreign key constraint defines an association between child records and parent records, as shown, and the association must be maintained during the updating of both tables, in order to preserve referential integrity in the data.

As shown, in some embodiments, a parent record (e.g. the third row of the parent table 710) and an associated child record (e.g. the second row of the child table 720) may reside on two different pages (pages A 715 and B 725 respectively), or two different storage locations (e.g. two different blocks). The ARTIST_ID value "3" in the child record must always refer to a valid ARTIST_ID value in a parent record. This thus represents a cross-page data constraint 740, which is an example of the cross-page constraint 134 discussed in connection with FIG. 1.

In order to not violate the cross-page data constraint, a database system with a single engine node may always that the parent record is consistent with the child record during an update of the child record. However, in a database system where multiple database writer nodes are optimistically writing the data, two different write nodes may perform concurrent updates to both the parent and the child tables, without knowing that the result of the two concurrent updates will violate the cross-page data constraint. Accordingly, as discussed, a write tracking transaction may be generated at the database writer node to track the page of the parent record (page A), to ensure that no unexpected changes occur on that record before the update of the child record on page B.

It is noted that while foreign key constraints represent one example use case for write tracking transactions as described herein, other types of use cases are also possible. As just one example, in some embodiments, a rollback operation in the database system may involve performing a number of compensating operations, to undo previous operations as part of the rollback. In some embodiments, during a compensating operation on a secondary index that is dependent on a primary index, the primary index itself must remain stable. That is, the validity of data in the secondary index is constraint by the data in the primary index. Uncoordinated updating of the two indices may cause corruption in the index data. Accordingly, write tracking transactions may be used to ensure that the primary index does not change during updates of the secondary index. Those skill in the art will appreciate that there are similar situations where the write tracking transactions may be useful. Generally, the write tracking transaction may be used in any situation in an optimistic multi-writer database system to ensure that one storage location remain unchanged before a dependent storage location is written.

Figure 8:
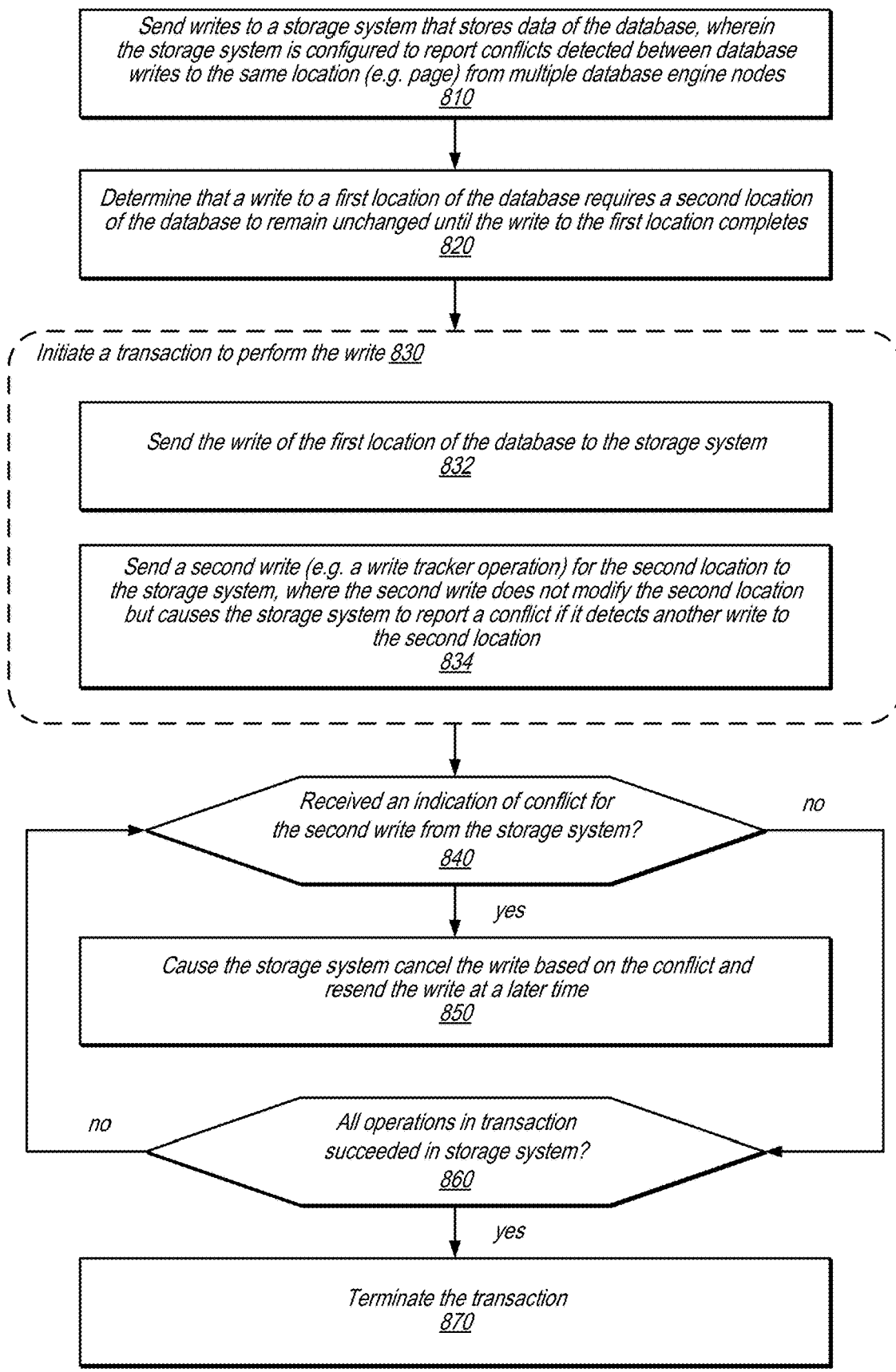
FIG. 8 is a flowchart illustrating a process of atomically enforcing cross-page data constraints in an optimistic multi-writer database, according to some embodiments.

FIG. 8 is a flowchart illustrating a process of atomically enforcing cross-page data constraints in an optimistic multi-writer database, according to some embodiments. In some embodiments, the depicted process may be performed by a database write node, such as database write node A 120 of FIG. 1.

At operation 810, writes are sent to a storage system that stores data of the database. The storage system may be configured to report conflicts detected between database writes to the same location (e.g. a page or a block) from multiple database engine nodes. In some embodiments, the database engine nodes may be database write nodes 120, 122, and 124 as discussed in FIG. 1, and the storage system may be implemented by the storage service 160 of FIG. 1. In some embodiments, the database system may be implemented in an architecture where multiple write nodes will optimistically perform write operations locally and send the write operations to a shared storage system. The writer nodes may be decoupled, and may apply the write operations locally in an optimistic fashion without checking for page conflicts with other write nodes. In some embodiments, the storage system may receive the write operations from the writer nodes and perform a conflict check for individual write operations. If any conflict is detected, the two database writer nodes involved in the conflict may be notified. In some embodiments, a page conflict may occur if two write operations attempt to simultaneously update a same version of a page. In that case, one of the write operations may be need to be aborted to resolve the conflict.

At operation 820, the database write node determines that a write to a first location of the database requires a second location of the database to remain unchanged until the write to the first location completes. In some embodiments, this determination may be made as part of a check for a cross-page or cross-location constraint check performed on write operations. In some embodiments, a location may represent a unit of storage location that may be individually fetched or updated by the storage system, such as a page or a block. In some embodiments, the check of the cross-page or cross-location data constraint may be performed by the cross-page constraint checking component 132 of FIG. 1.

As shown, operations 832 and 834 may be performed as a group of operations 320 to initiate a transaction to perform the write. In some embodiments, the transaction here may be the write tracking transaction 138 of FIG. 1. In some embodiments, the transaction may be generated and managed by the database write node, with no or little knowledge of the transaction maintained by the storage system.

At operation 832, the original write operation to the first location is sent to the storage system. In some embodiments, the write operation may be sent as a log entry for a database log, as discussed in connection with FIG. 6A. The write operation may be checked for page conflicts at the storage system, and any detected conflicts may be reported back to the database writer node.

At operation 834, a second write operation (e.g. a write tracker operation) is generated for the second location in the database, and sent to the storage system. The second write operation may be the write tracker operation 140 of FIG. 1, for example. In some embodiments, the WT operation may not modify the data of the second location. However, the WT operation may be used by the storage system for page conflict checks, to cause the storage system to report a conflict if it detects another write to the second location before the write operation to the first location. In some embodiments, the WT operation may be a special type of operation recognized by the storage system that will not be actually applied to the underlying data of the database. In some embodiments, the WT operation may be generated as a log entry for a database log, as discussed in connection with FIG. 6A.

At operation 840, a determination is made whether an indication of conflict is received from the storage system, which indicates a conflict for the second write operation. In some embodiments, this reported conflict for the WT operation may indicate that another database writer node is attempting to modify the second location during the write tracking transaction, before the write of the first location is completed. This other write represents a violation of the cross-page or cross-location data constraint.

If such a conflict is reported, the process proceeds to operation 850, where the database engine node causes the storage system to cancel the write operation to the first location based on the conflict. In some embodiments, the write operation may be sent to the storage system at a later time, for example, as part of another write tracking transaction. Accordingly, a failure of the WT operation will also cause a cancellation of the actual write operation. The database writer node will ensure that the two operations succeed or fail together, in an atomic transaction. In some embodiments, the reported conflict may cause the database writer node to perform a conflict resolution process with the other database writer node involved in the conflict. The two nodes may communicate to determine which of the two conflicting operations will go ahead. In some embodiments, the conflict resolution process may include a third (or primary) node, which may be tasked with resolving the conflict between the two writer nodes.

If no conflict on the WT operation is reported from the storage system, the process proceeds to operation 860, where it is determined whether all operations in the transaction have been reported to succeed in the storage system. As shown, if this determination is made, this means that all operations in the transaction have been deemed to be conflict-free at the storage system, and the process may proceed to operation 870, where the transaction can be terminated. However, if this condition at operation 860 is not yet true, the process loops back to operation 840 to wait for a conflict. The process thus loops or waits, until either some conflict is detected for an operation in the transaction, or until all operations are determined to be conflict-free. In some embodiments, database writer node may terminate the transaction based on other conditions, for example, by determining that a global consistency point of the database has advanced past a completion point of the transaction. In some embodiments, the database write node may confirm that all operation in the transaction have been added to the consistent state of the database by reading the target pages from the storage system.

FIG. 9 is a flowchart illustrating a process of atomically enforcing cross-page data constraints in an optimistic multi-writer database using generated log entries for write tracker operations, according to some embodiments.

As shown, operations 912, 914, 916, and 918 is a group of operations 910 performed at a database write node. The database write node may be, for example, database write node 120, as discussed in connection with FIG. 1. The database write node may be one of a number of database write nodes of a database that optimistically apply writes locally and send writes to a shared storage system (e.g. the storage service 160) without first checking for write conflicts from other nodes.

At operation 912, a determination is made that a write to be sent to a log-structured storage service modifies a first record in the first location (e.g. a first page) that is constrained by a foreign key constraint, and the foreign key constraint constraints the first record to a second record in the second location (e.g. a second page). In some embodiments, this determination may be performed by a component such as the cross-page constraint checker 132, in order to enforce the foreign key constraints in the database. As discussed, in optimistic multi-writer database systems, two writer nodes may break a foreign key constraint by concurrently modifying the parent table and the child table involved in the foreign key constraint.

At operation 914, a first log entry is generated for the write in a write tracking transaction. The first log entry may indicate a first log sequence number (LSN). In some embodiments, the first log entry may be the log entry 634 of FIG. 6A, and the write tracking transaction may be transaction 630 of FIG. 6A.

At operation 916, a second log entry is generated a write tracker operation in the write tracking transaction. The second log entry may be associated with a second LSN that occurs before the first LSN. Accordingly, a conflict on the WT operation may be reported before write operation can succeed. In some embodiments, the first and second LSNs may be consecutive LSNs, so that no intervening write can occur after the WT operation and before the write operation. In some embodiments, the second log entry may also indicate a last LSN that is locally known to have modified the second page. For example, in some embodiments, the database write node may maintain a local cache of page states, including the second page. The local cache may indicate the last LSN (according to that write node) that modified the second page. This last LSN may be included in the second log entry, and used by the storage service to detect any conflicting writes to the second page, as discussed in connection with FIG. 6A. In some embodiments, the second log entry may be the log entry 632 of FIG. 6A.

At operation 918, the first and second log entries are sent to the log-structured storage service. This operation may be performed in similar fashion as discussed in connection with FIG. 6A (e.g. operation 662). In some embodiments, the storage service may add the log entries to a database log, and check for and report conflicts for the operations indicated in the log entries.

As shown, operations 922, 924, and 926 is a group of operations 920 that is performed at the log-structured storage service. The log-structured storage service may be the storage service 160, as discussed in connection with FIG. 1.

At operation 922, the log-structured storage service checks for conflicts for the write operation and the WT operation against the page state of the log-structured storage service. In some embodiments, the page state may include the state of the database pages (e.g. database pages 170 of FIG. 1) and also the state of certain log records that have been confirmed to be part of the consistent state of the database (e.g. the conflict-free operations 168 of FIG. 1). In some embodiments, the conflict checking may also be performed against other incoming write operations received by the storage service. In some embodiments, the conflict checking may be performed by a component such as the operation conflict detection component 180 of FIG. 1.

At operation 924, a determination is made that the consistency point of the database has advanced beyond a completion point (e.g. a last LSN) of the write tracking transaction. In some embodiments, the database consistency point may be the database consistency point 686 of FIG. 6B, and the completion point may be the transaction completion point 676 of FIG. 6B. In some embodiments, the database consistent point may be ever-increasing, to include more write operations as part of the consistent state of the database. When this consistency point moves past the completion point of the write tracking transaction, this may indicate that all operations in the transaction have been deemed to be free of conflicts. The storage service may perform this check periodically, or in some embodiments, synchronously upon a change of the database consistency point.

At operation 926, the write tracker operation is expired, so that it is no longer used for further conflict checks. In some embodiments, the storage service may recognize the WT operation as a special type of operation that can be expired. Once the storage service determines that the entire write tracking transaction has succeeded, it may simply expire the WT operation, because the WT operation is no longer needed. In some embodiments, the expiration may be performed by removing the WT operation from a set of operations used to perform conflict checks. In some embodiments, the expiration may be performed by simply not adding the WT operation to a next queue to be applied to the database pages.

Figure 10:
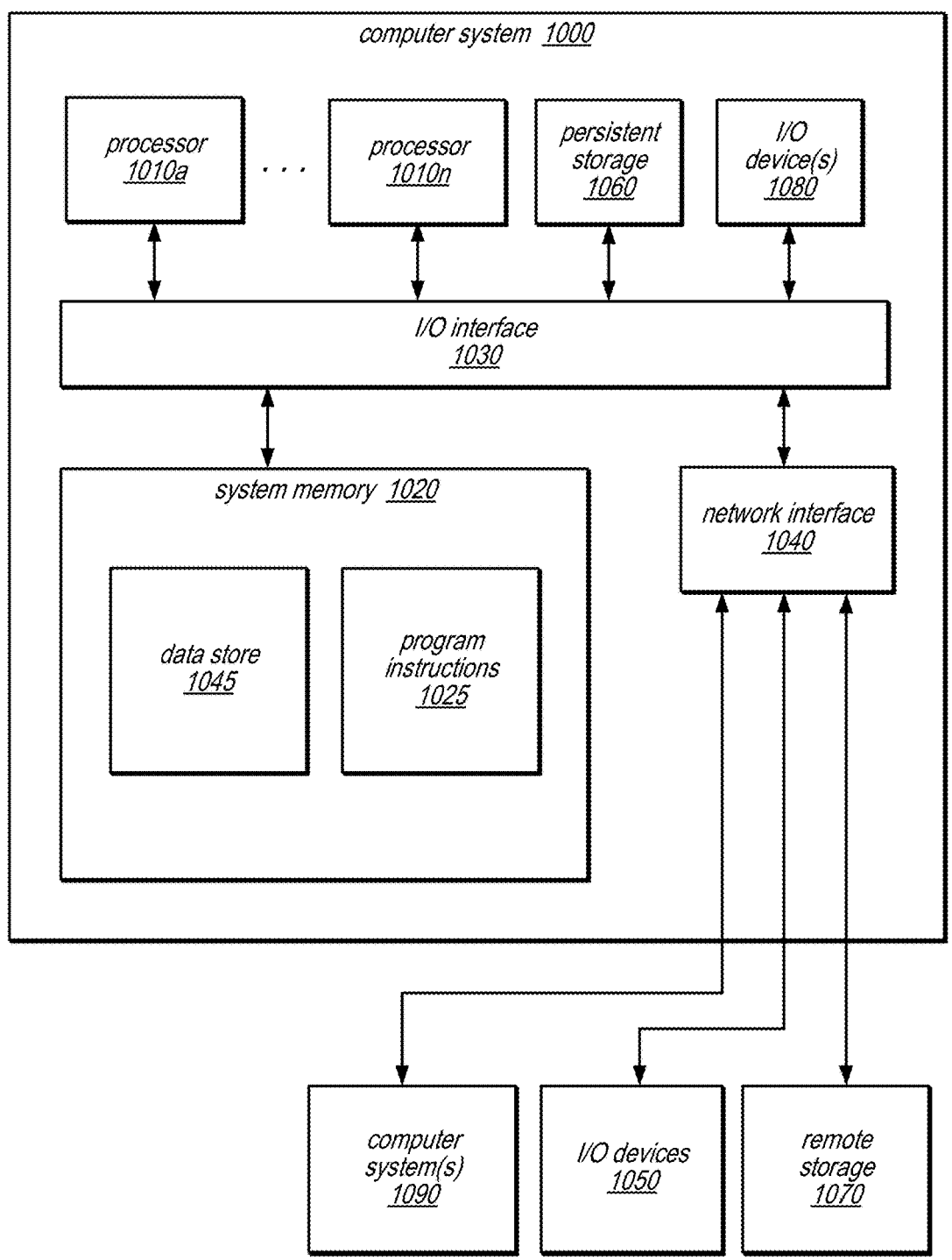
FIG. 10 is a block diagram illustrating an example computer system that can be used to implement one or more portions of an optimistic multi-writer database that employs write tracker operations to atomically enforce cross-page data constraints, according to some embodiments.

FIG. 10 is a block diagram illustrating an example computer system, according to some embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
one or more hardware processors with associated memory that implement a plurality of database engine nodes, configured to:
send writes to pages of a database to a storage service that stores the pages;

one or more hardware processors with associated memory that implement the storage service, configured to:
report conflicts detected between writes to individual ones of the pages received from different database engine nodes;
wherein at least one of the plurality of database engine nodes is configured to:
for a write to a first page of the database:
determine that the write requires a second page of the database to remain unchanged until the write to the first page completes;
initiate a transaction to perform the write that:
sends the write to the first page of the database to the storage service; and
sends a second write to the second page of the database to the storage service, wherein the second write does not modify the second page but causes the storage service to report a conflict responsive to the at least one of the plurality of database engine nodes detecting another write to the second page.

2. The system of claim 1, wherein the database engine node is configured to:
receive, from the storage service, an indication of the conflict for the second write;
based at least in part on the indication, cause the storage service to cancel the write; and
resend the write to the storage service at a later time.

3. The system of claim 1, wherein the storage service is configured to:
subsequent to a determination that a consistency point for the database has advanced past a completion point of the transaction, expire the second write so that the second write is not used for further conflict checks.

4. The system of claim 1, wherein to determine that the write requires a second page to remain unchanged until the write to the first page completes, the database engine node is configured to:
determine that the write modifies a first record in the first page that is constrained by a foreign key constraint to a second record in the second page.

5. The system of claim 1, wherein:
the database engine nodes are implemented in a database service provided by a service provider network, wherein the database service provides a plurality of databases for a plurality of different clients; and
the storage service is provided by the service provider network.

6. A method, comprising:
performing, by one or more hardware processors with associated memory implementing one of a plurality of database engine nodes in a database system:
sending writes to a storage system that stores data of a database, wherein the storage system is configured to report conflicts detected between writes received from the plurality of database engine nodes;
determining that a write to a first location of the database requires a second location of the database to remain unchanged until the write to the first location completes;
initiating a transaction to perform the write, including:
sending the write to the first location of the database to the storage system; and
sending a second write to the second location of the database to the storage system, wherein the second write does not modify the second location but causes the storage system to report a conflict responsive to the one of the plurality of database engine nodes detecting another write to the second location.

7. The method of claim 6, wherein:
the database engine nodes are implemented in a database service provided by a service provider network, wherein the database service provides a plurality of databases for a plurality of different clients; and
the storage system is implemented in a storage service provided by the service provider network.

8. The method of claim 6, further comprising:
performing, by the database engine node:
receiving, from the storage system, an indication of the conflict for the second write;
causing the storage system to cancel the write based at least in part on the indication of the conflict; and
resending the write to the storage system at a later time.

9. The method of claim 6, further comprising:
performing, by the storage system:
expiring the second write subsequent to a determination that a consistency point for the database has advanced past a completion point of the transaction.

10. The method of claim 6, wherein the initiating of the transaction comprises:
generating the second write as a type of write tracker operation that is not applied by the storage system to the database.

11. The method of claim 6, wherein the initiating of the transaction comprises:
generating the second write as part of the write to the first location, wherein the second location of the second write is indicated as a metadata attribute of the write to the first location.

12. The method of claim 11, wherein the determination that the write requires a second location to remain unchanged until the write to the first location completes comprises:
determining that the write modifies a first record in the first location that is constrained by a foreign key constraint to a second record in the second location.

13. The method of claim 6, wherein:
the storage system is a log-structured storage system that stores received writes in a log;
the sending of the write comprises sending a first log entry indicating the write with a first log sequence number (LSN); and
the sending of the second write comprises sending a second log entry with a second LSN, wherein the second LSN precedes the first LSN.

14. The method of claim 13, wherein the initiating of the transaction comprises:
generating the second log entry, wherein the second log entry includes a last known LSN that modified a cached version of the second location maintained by the database engine node.

15. The method of claim 6, wherein the initiating of the transaction comprises:
including in the transaction a third write to a third location of the database to the storage system, wherein the third write does not modify the third location but causes the storage system to report another conflict when the database engine node detects a different write to the third location;
wherein the transaction is cancelled if the other conflict is not resolved in favor of the transaction.

16. One or more non-transitory computer-accessible storage media storing program instructions that when executed on or across one or more processors implements one of a plurality of database engine nodes in a database system and cause the one of the plurality of database engine nodes to:
- send writes to a storage system that stores data of a database, wherein the storage system is configured to report conflicts detected between writes received from the plurality of database engine nodes;
- determine that a write to a first location of the database requires a second location of the database to remain unchanged until the write to the first location completes;
- initiate a transaction to perform the write to:
  - send the write to the first location of the database to the storage system; and
  - send a second write to the second location of the database to the storage system, wherein the second write does not modify the second location but causes the storage system to report a conflict responsive to the one of the plurality of database engine nodes detecting another write to the second location.

17. The one or more non-transitory computer-accessible storage media of claim 16, wherein:
- the database engine nodes are implemented in a database service provided by a service provider network, wherein the database service provides a plurality of databases for a plurality of different clients; and
- the storage system is implemented in a storage service provided by the service provider network.

18. The one or more non-transitory computer-accessible storage media of claim 16, wherein the program instructions when executed on or across the one or more processors cause the database engine node to:
- receive, from the storage system, an indication of the conflict for the second write;
- cause the storage system to cancel the write based at least in part on the indication of the conflict; and
- resend the write to the storage system at a later time.

19. The one or more non-transitory computer-accessible storage media of claim 16, wherein, to initiate the transaction, the program instructions when executed on or across the one or more processors cause the database engine node to:
- generate a log entry indicating the second write, wherein the log entry includes a last known log sequence number (LSN) that modified a cached version of the second location maintained by the database engine node.

20. The one or more non-transitory computer-accessible storage media of claim 16, wherein, to determine that the write requires a second location to remain unchanged until the write to the first location completes, the program instructions when executed on or across the one or more processors cause the database engine node to:
- determine that the write modifies a first record in the first location that is constrained by a foreign key constraint to a second record in the second location.

\* \* \* \* \*